Dec. 9, 1958  B. N. TORELL  2,863,282
WATER INJECTION SYSTEM FOR GAS TURBINE POWER PLANT
Filed Jan. 9, 1953
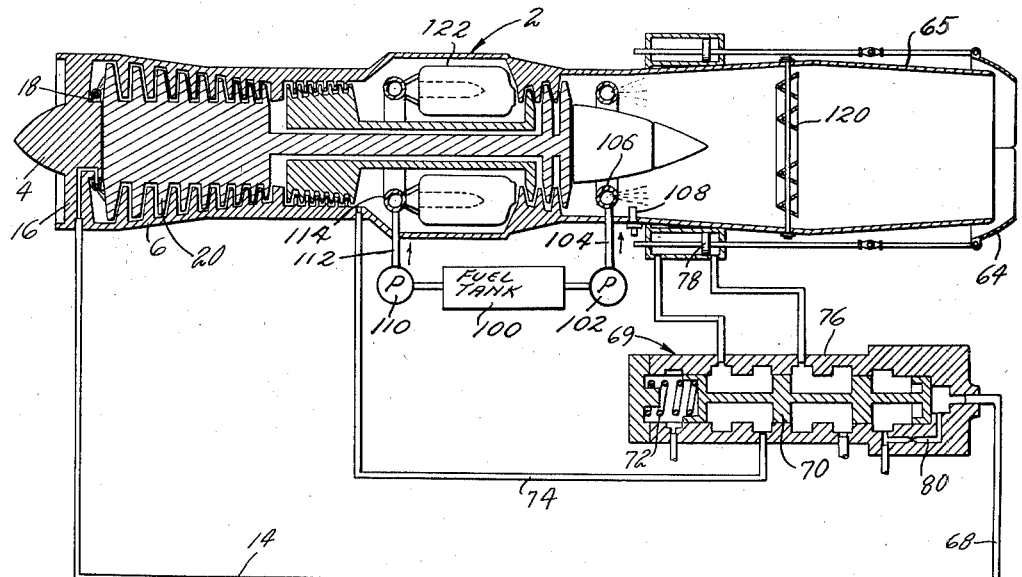
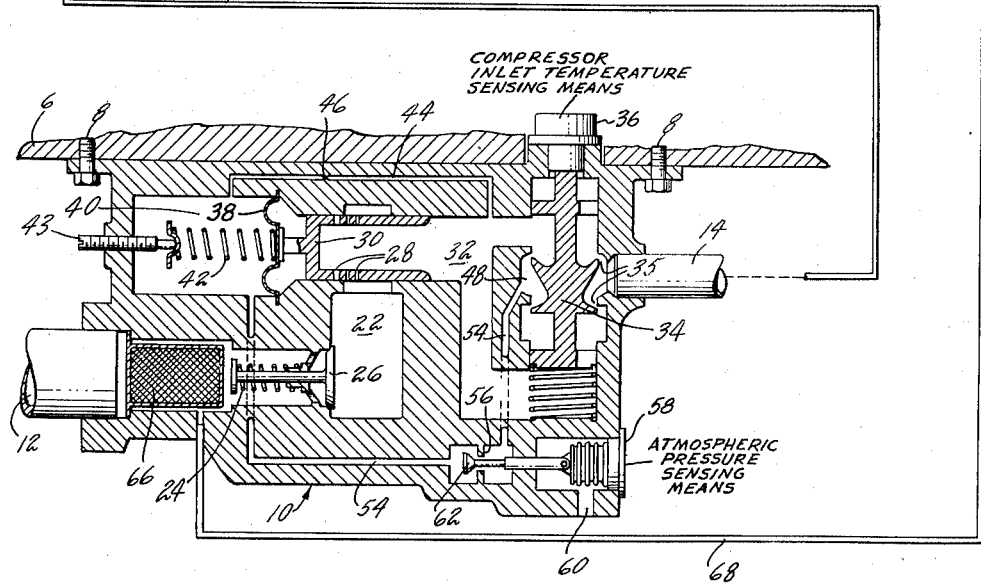
INVENTOR
BRUCE N. TORELL
BY
AGENT

United States Patent Office 2,863,282
Patented Dec. 9, 1958

2,863,282
WATER INJECTION SYSTEM FOR GAS TURBINE POWER PLANT

Bruce N. Torell, Wethersfield, Conn., assignor to United Aircraft Corporation, East Hartford, Conn., a corporation of Delaware Application January 9, 1953, Serial No. 330,430

4 Claims. (Cl. 60—35.6)

This invention relates to gas turbine power plants and more particularly to a control for coolant injection to effect thrust augmentation.

During the operation of turboprop and turbojet power plants, it is sometimes desirable to have extra bursts of power or thrust available for short periods of time during such phases of operation as take-off, wave-off or during military combat maneuvers. This short period thrust augmentation has been accomplished by burning supplementary fuel in an afterburner which is part of the power plant or by injecting water or a mixture of water and another fluid into the power plant at the compressor inlet or into the combustion chambers.

The addition of an afterburner or auxiliary engines to provide the extra bursts of power or thrust for short periods of time would result in a relatively large increase in installed power plant weight, and would appreciably increase the cruising fuel consumption. The incorporation of a water injection system in an engine having an afterburner provides the advantage of thrust augmentation from both the use of the water injection system and the use of the afterburner. The water injection thrust augmentation system may also be used on an engine not having an afterburner and thereby provides the advantage of thrust augmentation beyond that developed by the engine alone, and without the need of a space consuming and heavy afterburner unit. In short, by the addition of very little weight this water injection thrust augmentation system may be installed on an engine with afterburner to provide thrust beyond that which the engine with afterburner unit alone is able to provide, or when used on an engine without afterburner, provides thrust beyond that which the engine alone can provide.

The injection of water into the compressor inlet of a gas turbine power plant serves to lower the temperature of the air within the compressor. This permits a greater flow of air through the compressor, with air at a higher pressure being supplied to the turbine and a greater pressure drop occurring across the turbine. The pressure drop across a turbine is a measure of available energy and with the increased pressure drop due to the injection of water, a greater percentage of the available energy can be used for purposes of propulsion after the amount of energy necessary to drive the compressor has been extracted from the turbine.

It is an object of this invention to provide a means of controlling thrust augmentation of a gas turbine power plant as a function of inlet temperature and altitude, that is, ambient atmospheric pressure, or of inlet temperature alone.

It is an object of this invention to provide a mechanically simple control for coolant injection as a thrust augmentation means.

It is an object of this invention to provide a control for a thrust augmentation means which is light in weight and efficient and dependable in operation.

It is an object of this invention to provide a means of causing the afterburner exhaust nozzle to open during power plant operation with fluid injection and to close the nozzle when fluid injection is no longer being used.

Other objects and advantages will be apparent from the following specification and claims and from the accompanying drawing which illustrates an embodiment of the invention.

In the drawing, the single figure is a sectional view of a gas turbine power plant with a fluid injection thrust augmentation system in accordance with this invention.

Referring to the drawing in detail, inlet air to gas turbine power plant 2 enters the annulus formed by nose cone 4 and compressor inlet housing 6. Bolts 8 secure fluid injection control 10 to housing 6. Control 10 receives fluid to be injected into the power plant through inlet 12 and discharges it through line 14 to compressor inlet strut 16 and injection manifold 18, from which it is sprayed radially outward into the air entering compressor 20. Injection manifold 18 is so positioned and constructed that the fluid will be injected into the air at the compressor inlet at such an angle that its velocity relative to the gas stream will be great to facilitate evaporation and consequent cooling.

Pressurized fluid enters through control inlet 12 into chamber 22 after overcoming the force of spring 24 and opening poppet valve 26. The fluid passes from chamber 22 through ports 28 in regulating valve 30 into chamber 32. Flow from this chamber is controlled by spring loaded valve 34, being through variable orifices 35 into line 14 leading to the power plant.

It will be seen that control 10 consists further of compressor inlet temperature sensing element 36 which is in contact with control valve 34 to move control valve 34 in an opening direction as compressor inlet temperature increases and to move control valve 34 in a closing direction as compressor inlet temperature decreases. Regulating valve 30 is attached to diaphragm 38 and separates chamber 32 from chamber 40. Diaphragm 38 has a continuous force exerted against it by spring 42 which force can be adjusted by screw 43. Chambers 32 and 40 are connected through passage 44 containing fixed orifice 46. Chamber 48, immediately downstream of variable orifices 35 and at the inlet to line 14, is connected to chamber 40 through passage 54 in which variable bleed 56 is located. Bellows 58, in free communication with the atmosphere through aperture 60, is connected to valve 62 in bleed 56 and shifts the valve to vary the area of the bleed in accordance with changes in atmospheric pressure.

Control 10 also serves to open exhaust nozzle 64 on afterburner or engine exhaust duct 65, during fluid injection. This may be desirable to obtain higher speeds on the low pressure rotor of a split compressor during water injection on a spool type gas turbine power plant. Exhaust nozzle 64 is opened when pressurized injection fluid, entering control 10 through inlet 12 and filter 66, is admitted through line 68 to exhaust nozzle control 69. The fluid shifts servo piston 70 to the left against the force of spring 72. With servo piston 70 in this position, compressor discharge pressure in line 74 is admitted through housing 76 to the right side of exhaust nozzle actuating piston 78, which pressure shifts the piston to the left to open exhaust nozzle 64. Details of the exhaust nozzle structure are neither shown nor described, but may be similar to the structure disclosed in copending application Serial No. 193,734, filed November 2, 1950, for Nozzle Actuating System. When fluid injection is terminated, the pressurized injection fluid will drain from the right side of piston 70 through restricted bleed 80 and spring 72 will move piston 70 to its far right position. In this position compressor discharge air passes through exhaust nozzle control housing 76 to the left side of exhaust nozzle actuating piston 78 to close the exhaust nozzle.

It should be noted that when the coolant injection system which is the subject matter of this application is used with a turbine engine having an afterburner 65, for proper but standard afterburner operation, fuel will be provided to the afterburner from fuel tank 100 through afterburner fuel pump 102, thence through line 104 into annular fuel manifold 106 which injects fuel into afterburner 65. The fuel so injected into the afterburner is ignited by sparkplug 108 and combustion is supported behind flameholders 120. The same fuel tank 100 can provide fuel to the main combustion chambers 122 through main engine fuel pump 110 thence through line 112 and annular fuel manifold 114 and into combustion chambers 122.

Operation

Since the fluid injected into the power plant is always in motion, the fluid injection control disclosed here utilizes the principle that flow through a valve is proportional to the product of the area of the valve opening and the pressure drop across the valve. It is desired to inject the fluid into the power plant as a function of compressor inlet temperature and altitude so, these two parameters are used to regulate the control valve opening area and the pressure drop across a control valve.

Valve 34 in the injection control is this control valve and the position of the valve is determined by temperature sensing element 36 located in the airstream at the compressor inlet to measure compressor inlet temperature and vary the area of variable orifices 35 as a function of compressor inlet temperature. At the same time, the pressure drop across the control valve 34 is held constant by regulating valve 30.

Altitude sensitive bellows 58 and its associated variable bleed 56 are used to introduce the altitude factor into the system. Consider that the fluid pressure in chamber 32 is $P_1$, in chamber 40 is $P_2$ and in chamber 48 is $P_3$. As control valve 34 takes a new position in response to the dictates of temperature sensing element 36, regulating valve 30 seeks a position at which the pressure difference between $P_1$ and $P_2$ is approximately constant. Should $P_1$ increase due to a reduction in the area of variable orifices 35, regulating valve 30 moves to the left, increasing $P_2$ until equilibrium is reached at approximately the constant pressure differential $P_1$ minus $P_2$. Flow through fixed orifice 46 is constant due to this constant pressure difference. If the area of variable bleed 56 controlled by altitude sensing bellows 58 is changed due to a change in ambient pressure, the flow of injection fluid between chambers 40 and 48 is altered and the pressure drop between these chambers, $(P_2-P_3)$, varies accordingly; as a function of altitude. Since the pressure drop across control valve 34, $(P_1-P_3)$, is the sum of $(P_1-P_2)$ and $(P_2-P_3)$, the pressure drop is, as described above, a function of altitude so that the pressure drop $P_1-P_3$ and hence coolant flow increases with an increase in ambient atmospheric pressure and so that the pressure drop $P_1-P_3$ and hence coolant flow decreases with a decrease in ambient atmospheric pressure. By the use of this control arrangement, the flow of fluid injection through control valve 34 can be made a function of compressor inlet temperature and altitude.

It is to be understood that this control can meter fluid to the power plant as a function of compressor inlet temperature only by merely removing altitude sensitive bellows 58 and variable bleed 56 from the system. Under these conditions the area of valve opening of control valve 34 is a function of compressor inlet temperature since control valve 34 is integrally attached to temperature sensing element 36 and moves in accordance with the dictates thereof. For each new position assumed by control valve 34, regulator valve 30 seeks a new position to maintain approximately a constant pressure drop between chambers 32 and 40. Since variable bleed 56 is no longer in the system, the pressure in chamber 48 is approximately equal to that in chamber 40 with the result that the pressure drop across control valve 34 is approximately constant, $P_1-P_2$. Thus the flow of injection fluid through control valve 34 is a function of compressor inlet temperature only.

It is to be understood that the invention is not limited to the embodiment herein illustrated and described but may be used in other ways without departure from its spirit as defined by the following claims.

I claim:

1. In combination with a gas turbine power plant having a compressor with an inlet, an afterburner downstream of said compressor and having a variable area exhaust nozzle attached to the downstream end thereof, in combination with a control for injecting coolant into the inlet of said power plant compressor having a temperature sensing element located at the inlet of said compressor to sense compressor inlet temperature, a control valve in said coolant injection control through which coolant flows to said power plant, said control valve being integrally attached to said temperature sensing element and positioned as a function of compressor inlet temperature, two coolant filled chambers, a spring biased diaphragm separating said chambers, two coolant conveying lines in communication with both of said chambers, a regulating valve attached to the anti-spring side of said diaphragm and located in the first of said chambers such that the coolant must pass through said regulating valve and into said first chamber and then through said control valve before being conducted to said compressor inlet for injection therein, the second of said chambers being in communication with each side of said control valve through said coolant lines, a variable area orifice located in one of said coolant lines, and ambient atmospheric pressure sensing means varying the area of said orifice such that the pressure drop across said control valve is a function of ambient atmospheric pressure while said control valve is positioned by said temperature sensing element so that the coolant flow to said compressor inlet for injection therein is a function of compressor inlet temperature and ambient atmospheric pressure, compressor discharge pressure actuated means for varying the area of said exhaust nozzle, a nozzle actuation control for regulating the admission of compressor discharge pressure to said nozzle area varying means, and a coolant connection between said fluid injection control and said nozzle actuation control through which coolant is conducted to said nozzle control to regulate the admission of compressor discharge pressure to said nozzle area varying means in response to coolant flow in said coolant injection control.

2. In combination with a gas turbine power plant having a compressor with an inlet, an afterburner downstream of said compressor and having a variable area exhaust nozzle attached to the downstream end thereof, in combination with a control for injecting coolant into the inlet of said power plant compressor having a temperature sensing element located at the inlet of said compressor to sense compressor inlet temperature, a control valve in said coolant injection control through which coolant flows to said power plant, said control valve being integrally attached to said temperature sensing element and positioned as a function of compressor inlet temperature, two coolant filled chambers, a spring biased diaphragm separating said chambers, two coolant conveying lines in communication with both of said chambers, a regulating valve attached to the anti-spring side of said diaphragm and located in the first of said chambers such that the coolant must pass through said regulating valve and into said first chamber and then through said control valve before being conducted to said compressor inlet for injection therein, the second of said chambers being in communication with each side of said control valve through said coolant lines, a variable area orifice located in one of said coolant lines, and ambient atmospheric pressure sensing means positioned to vary the area of said orifice such that the pressure drop across said control valve is a function of ambient atmospheric pressure while said control valve is positioned by said temperature sensing element so that the coolant flow to said compressor inlet for injection therein is a function of compressor inlet temperature and ambient atmospheric pressure.

3. A coolant injection control for use with a power plant having a compressor, means to connect said control to said compressor, said control comprising a control valve through which coolant must flow to get to said compressor, a compressor inlet temperature sensing element attached to said control valve, a regulating valve in series with said control valve, and an ambient atmospheric pressure sensing element positioning said regulating valve, a poppet valve located in said control, the position of said control valve being determined by compressor inlet temperature and the pressure drop across said control valve being determined by said regulating valve to meter coolant to be injected into said compressor as a function of compressor inlet temperature and ambient atmospheric pressure, said poppet valve being so positioned as to prevent the loss of compressor air from said power plant during periods when fluid injection is not desired.

4. Apparatus for controlling the injection of coolant into a power plant, including a control valve, a power plant inlet temperature sensing element positioning said control valve and opening said control valve as said power plant inlet temperature increases, a regulating valve in series with said control valve and regulating the pressure drop thereacross, and an ambient atmospheric pressure sensing element positioning said regulating valve, the position of said control valve being determined directly by said temperature sensing element and the pressure drop across said control valve being determined by said regulating valve such that the coolant to be injected into said power plant is metered as a function of power plant inlet temperature and ambient atmospheric pressure.

References Cited in the file of this patent
UNITED STATES PATENTS

| | | |
|---|---|---|
| 2,438,998 | Halford | Apr. 6, 1948 |
| 2,498,939 | Bobier | Feb. 28, 1950 |
| 2,551,229 | Alford et al. | May 1, 1951 |
| 2,559,814 | Whittle | July 10, 1951 |
| 2,569,497 | Schiesel | Oct. 2, 1951 |
| 2,581,275 | Mock | Jan. 1, 1952 |
| 2,609,662 | Vogt et al. | Sept. 9, 1952 |
| 2,670,599 | Davis et al. | Mar. 2, 1954 |
| 2,715,311 | Coar | Aug. 16, 1955 |
| 2,786,331 | Williams | Mar. 26, 1957 |

FOREIGN PATENTS

| | | |
|---|---|---|
| 614,106 | Great Britain | Dec. 9, 1948 |